UNITED STATES PATENT OFFICE.

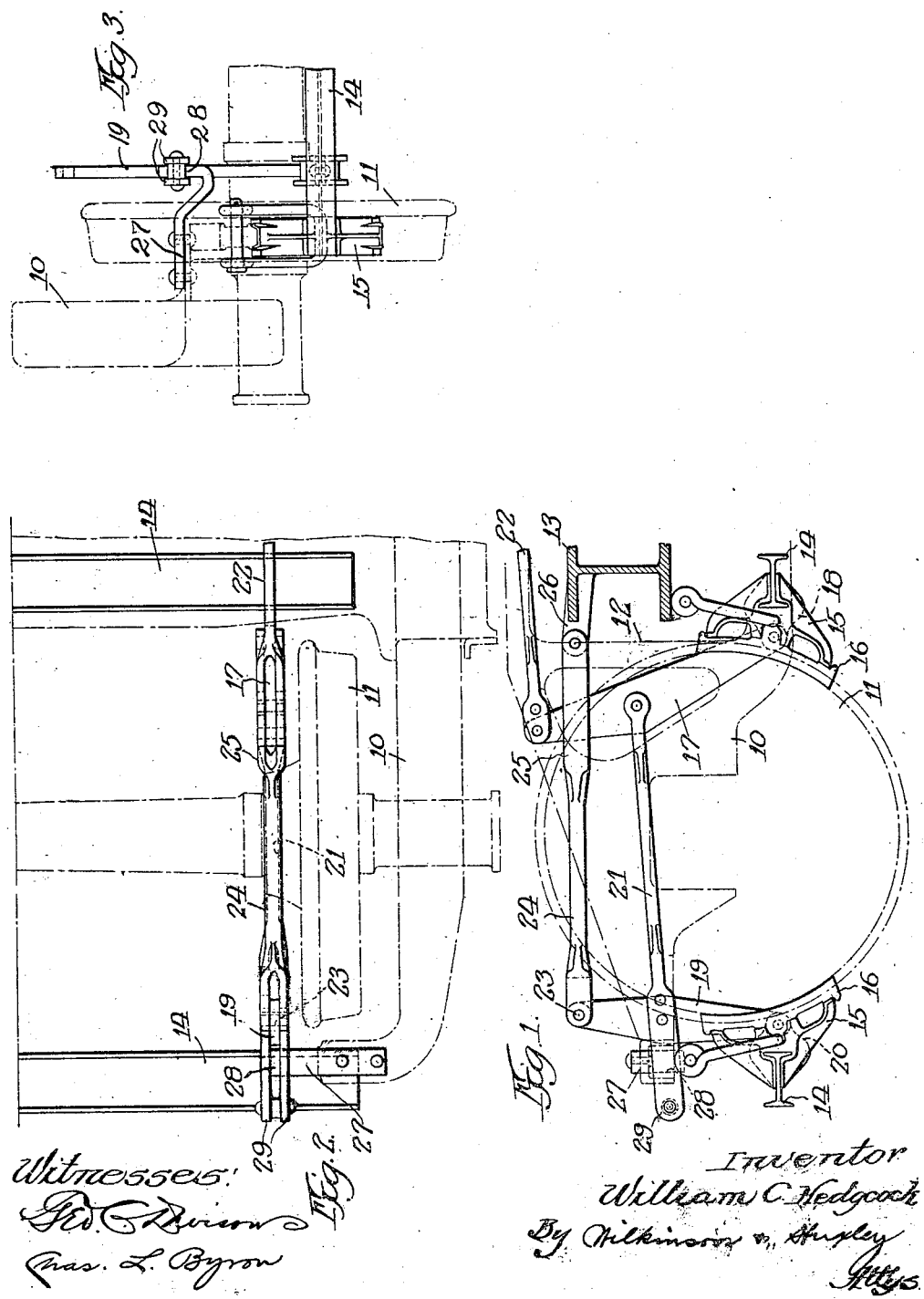

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE ARRANGEMENT.

1,283,760.  Specification of Letters Patent.  Patented Nov. 5, 1918.

Application filed July 21, 1917. Serial No. 181,939.

*To all whom it may concern:*

Be it known that I, WILLIAM C. HEDGCOCK, a citizen of the United States, and resident of Chicago, in the county of Cook and State of Illinois, have invented certain new and useful Improvements in Brake Arrangements, of which the following is a specification.

This invention relates to brake arrangements.

One of the objects of the invention is to improve the manner of fulcruming or anchoring the dead lever of a brake rigging.

Another object is to maintain in a novel manner the dead lever and its associated parts in proper alinement.

Another object is to provide a brake arrangement adapted to meet the various requirements for successful commercial operation.

These and other objects are accomplished by providing in brake mechanism, the combination of a truck member, a dead brake lever, a live brake lever, and a member connected to said dead brake lever and having a guide opening to receive said live brake lever and being anchored to said truck member for transmitting thrust to the latter.

The invention is illustrated on the accompanying sheet of drawings in which Figure 1 is a fragmentary side elevation, parts being in section, of brake mechanism embodying my invention;

Fig. 2 is a fragmentary plan view of the same; and

Fig. 3 is a fragmentary end elevation.

The various novel features of the invention will be apparent from the following description and drawings and will be particularly pointed out in the appended claims.

Reference being had to the drawings it will be seen that I have provided a truck member 10 carried by wheels 11, only one of which is shown, and having an opening between columns 12 in which is movably mounted a truck bolster 13. Referring to Figs. 1 and 2 of the drawings, it will be noted that in this particular instance brake beams 14 are mounted upon opposite sides of each pair of wheels and carry brake heads 15 having shoes 16 which are engageable with the wheel 11. The lower end of a live brake lever 17 is pivotally connected to a fulcrum member 18 connected to one of the brake beams 14, and the lower end of a dead brake lever 19 is pivotally connected to a fulcrum member 20 which is connected to the other brake beam 14. These brake levers 17 and 19 are pivotally connected to a rod 21 which forms a connection between the brake levers. To the upper end of the live brake lever 17 is pivotally connected a rod 22 which connects the live brake lever 17 with further units of the brake mechanism. The upper end of the dead brake lever 19 is pivotally connected by a pin 23 to a compression rod 24 which has a bifurcated jaw portion 25 forming a guide opening, which embraces opposite sides of the live lever 17. This compression rod 24 thereby carries the thrust from the dead brake lever 19 past the live lever 17 to a suitable bracket 26 mounted on some suitable portion of the truck. In this particular instance the bracket 26 is on the truck bolster 13.

A bracket 27 is attached to one extremity of the truck frame 10, and has a depending tongue 28 which passes down between the jaws 29 formed at one extremity of the rod 21. It will be noted that the dead lever 19 is pivotally connected to the rod 21 between its jaws 29, and due to the fact that the tongue 28 of bracket 27 also passes through the jaws 29 of rod 21, the dead brake lever 19 is maintained in vertical alinement and at the same time prevents the compression rod 24 from moving laterally. It will be appreciated that the jaws 29 may optionally be either on rod 21 or on the rod 24. In either case the tongue 28 of the bracket 27 will engage with said jaws for accomplishing the functions mentioned. It will be apparent also that instead of providing either of the rods 21 or 24 with jaws, the bracket 27 may be provided with jaws to receive therebetween the rods 21 or 24, which rods in such case would form the tongue member. By providing the rod 24 with an opening or with spaced jaws 25 which pass on either side of the live brake lever 17, means is provided for assisting in maintaining the various parts of the brake mechanism in proper vertical alinement. Furthermore, by means of this arrangement the forces are transmitted in a more direct manner and without producing any eccentric or angular thrusts such as are occasioned when the compression or strut member 24 passes to one side of the live brake lever on an angle.

It will thus be seen that in cases where it is undesirable for any reason to anchor or fulcrum the dead lever 19 on the extreme end of the truck frame, that by use of the arrangement herein shown and described, the anchoring thrust is transmitted to a more convenient point. This undesirability of anchoring to the end of the truck frame may be occasioned by the fear of throwing too heavy a stress on the truck frame at such a point, or by clearance conditions preventing the application of a bracket of sufficient strength or proper design to the truck frame.

By means of the pivotal connections between the rod 24 and dead brake lever 19, and between said rod 24 and the bolster bracket 26, the truck bolster 13 is permitted a free upward and downward movement on its springs without in any way hampering or interfering with the operation of the brake.

It is apparent that there may be various modifications of the invention as herein particularly shown and described, and it is my intention to cover all such modifications which do not involve a departure from the spirit and scope of the invention as set forth in the following claims.

I claim:

1. In brake mechanism, the combination of a truck member, a plurality of brake levers, a member connected to one of said brake levers and having a guide opening to receive another of said brake levers and being anchored to said truck member for transmitting thrust to the latter, and means associated with one of said brake levers for maintaining the same in vertical alinement.

2. In brake mechanism, the combination of a truck member, a dead brake lever, a live brake lever, a member connected to said dead brake lever and having a guide opening to receive said live brake lever to prevent lateral movement of said member and being anchored to said truck member for transmitting thrust to the latter, and guide means associated with the dead brake lever for maintaining the same in vertical alinement.

3. In brake mechanism, the combination of a truck member, a dead brake lever, a live brake lever, a rod pivotally connected to each of said levers and connecting the same, another rod connected to the dead brake lever and having jaws on opposite sides of the live brake lever to prevent lateral movement of said second rod, and being connected to said truck member for transmitting thrust thereto, and guide means operatively connected with one of said rods for maintaining said levers in vertical alinement.

4. In brake mechanism, the combination of a truck bolster, a plurality of brake levers, and a member pivotally connected to one of said brake levers and having a guide opening for receiving the other brake lever and being pivotally connected to said truck bolster to provide free upward and downward movement of the truck bolster.

Signed at Chicago, State of Illinois, this 18th day of July, A. D. 1917.

WILLIAM C. HEDGCOCK.